F. E. RICKETTS.
AUTOMATIC ELECTRIC REGULATOR.
APPLICATION FILED JULY 23, 1910.
1,096,755.
Patented May 12, 1914.
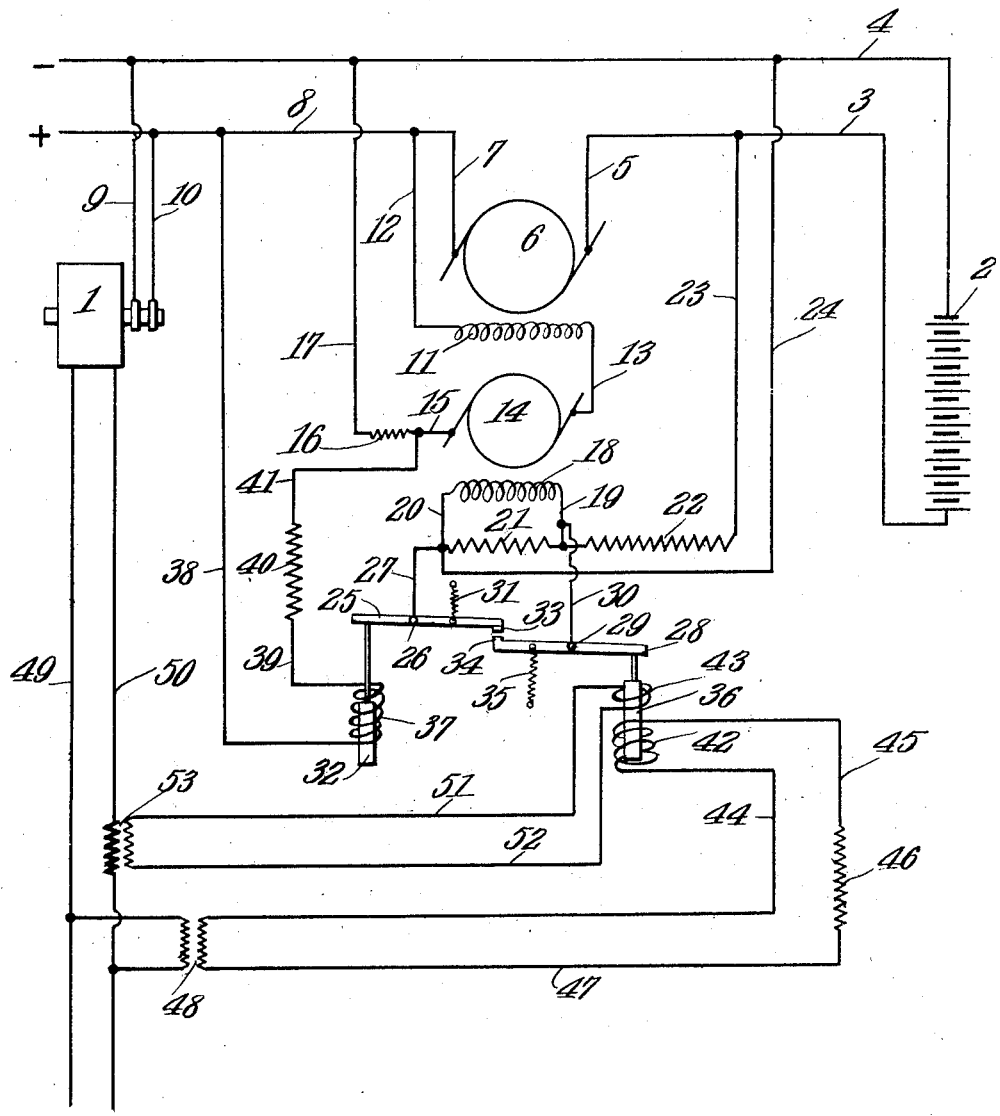
Forrest E. Ricketts
Witnesses
Inventor,
C. A. Snow & Co.
Attorneys.

UNITED STATES PATENT OFFICE.

FORREST E. RICKETTS, OF BALTIMORE, MARYLAND.

AUTOMATIC ELECTRIC REGULATOR.

1,096,755.  Specification of Letters Patent.  Patented May 12, 1914.

Application filed July 23, 1910. Serial No. 573,506.

*To all whom it may concern:*

Be it known that I, FORREST E. RICKETTS, a citizen of the United States, residing at the city of Baltimore, State of Maryland, have invented a new and useful Improvement for Automatic Electric Regulators, of which the following is a specification.

The present invention relates to improvements in automatic electric regulators adapted for controlling the field current of electric generators in response to variations of electric conditions in the armature circuit.

In accordance with the present invention the field current of the generator is controlled by means of a regulating dynamo, the field circuit of which is controlled by an automatic switch adapted for opening and closing a circuit of small current strength. The regulating dynamo is here shown with its armature circuit in series with a battery in which case its voltage is only a small part of the field voltage. If the battery is omitted the voltage of the regulating dynamo will be equal to that of the field circuit of the generator in which case it will perform the part of an exciter for the generator as well as that of the regulating generator.

Regulation is accomplished through a series of machines each of which has a certain amount of inductance which tends to delay the response to the automatic switch. Therefore before the effect of the automatic switch could be felt on the circuit to be regulated to thereby cause the automatic switch to reverse its action the first machine of the series will have built up a voltage so much in excess of that required that it will be slow in responding to the action of the automatic switch. That is, it will have to reduce its voltage to normal before it can actively respond to the action of the automatic switch. This will result in marked surges in the voltage of the circuit to be regulated to which surges the regulator will be slow to respond.

In the present invention the automatic switch is made responsive to the voltage of each step of the series so that anyone of the machines can act to reverse the action of the automatic switch independent of the others, thereby keeping the voltage fluctuations of the various steps within narrow limits.

To better understand the invention, reference will be made to the accompanying drawing, forming a part of this specification, in which is illustrated an application of the controlling means in operating relation to an electric system to be regulated.

In the drawing there is shown a generator 1 of the revolving field type.

The field current is furnished by means of any suitable source of electricity which in the system illustrated is a battery 2. One side, say the positive side, of the battery is connected to an exciter main 3 while the other side is connected to another exciter main 4. The exciter main 3 is connected through the conductor 5 to one terminal of a dynamo 6. The other terminal of the dynamo 6 is connected through conductor 7 to a conductor 8. The field coils of the generator 1 are connected through conductors 9 and 10 respectively, to the conductors 4 and 8.

The dynamo 6 has a field coil 11 one terminal of which is connected through a conductor 12 to the positive main 8, the other terminal of the field coil 11 is connected through a conductor 13 to one terminal of an exciter 14. The other terminal of the exciter 14 is connected through conductor 15 resistance 16, and conductor 17 to the negative main 4. The field coil 18 of the exciter 14 is connected in parallel with the resistance 21 through conductors 19 and 20, conductor 19 is connected through resistance 22 and conductor 23 to the positive main 3. The conductor 20 is connected through conductor 24 to the negative main 4. An automatic switch adapted for short-circuiting the field coil 18 is composed of two levers, one 25 is pivoted at the point 26 and electrically connected to conductor 20 through a conductor 27, the other lever 28 is pivoted at the point 29 and connected by conductor 30 to the conductor 19. The lever 25 is under the control of the spring 31 tending to open the contacts 33 and 34 and the magnet 32 tending to close the contacts 33 and 34. The lever 28 is under the control of a spring 35 tending to open the contacts 33 and 34 and the core 36 tending to close the contacts 33 and 34.

The core 32 is freely suspended in a solenoid 37 so related thereto as to exert an upward pull on the core 32 when an electric current is passed through the solenoid. One terminal of the solenoid 37 is connected through a conductor 38 to the positive main 8, the other terminal being connected through conductor 39 resistance 40, and conductor 41 to conductor 15. The core 36 is freely suspended in two solenoids 42 and 43. The solenoid 42 is connected through conductor 44 and the conductor 45, resistance 46, and conductor 47, to a transformer 48 which is connected across the armature leads 49 and 50 of the generator 1.

The solenoid 43 is connected through conductors 51 and 52 to a current transformer 53 which is connected in series with one of the armature leads of the generator 1. The solenoid 42 is so related to the core 36 that an electric current passing through it will tend to pull down on the core 36 and the solenoid 43 is so placed that a current passing through it will tend to oppose the pull of the solenoid 42. Let it be assumed that the lever 28 has been moved by the core 36 until the contact 34 engages the contact 33. Then current will flow from the positive main 3 through the conductor 23, resistance 22 to the conductor 19, then through conductor 30, levers 28 and 25 and conductor 27 to conductor 20 then through conductor 24 to the negative main 4. Owing to the low resistance of the path from conductor 19 to conductor 20 by way of the levers 28 and 25, no current will flow through the field coil 18. This will allow the difference of potential between the armature terminals of the exciter 14 to drop to zero. Then current will flow from the positive main 8 through conductor 12, field coil 11, conductor 13, armature of exciter 14, conductor 15, resistance 16 and conductor 17 to the negative main 4. This current passing through the field coil 11 will cause the dynamo 6 to generate a potential between conductors 5 and 7 in a direction to lower the potential of the armature leads 49 and 50. This will be called a negative voltage being in a direction to lower the voltage to be regulated. When however the contacts 33 and 34 separate the current flowing through conductor 23 and resistance 22 will divide at the conductor 19 part flowing through resistance 21 and part through field coil 18 combining again at conductor 20 and returning to main 4 by way of conductor 24. The resistance 21 may be omitted which would cause all the current flowing in resistance 22 to flow through the field coil 18 but owing to the inductance of the field coil 18 this would cause a high voltage between contacts 33 and 34, at the instant the contact was broken. If the resistance 21 were omitted, when the contacts 33 and 34 are together all of the current flowing through resistance 22 would pass through the contacts, but the instant contact was broken the inductance of the field coil 18 would oppose the sudden building up of the current in the coil, which would be nearly equivalent to opening the circuit with the contacts and the instantaneous voltage across the contacts would approximate the voltage of the conductors 3 and 4. In practice this would destroy the contacts. This current flowing through the field coil 18 will cause the exciter 14 to generate a potential in the direction to oppose the flow of current from the main 8 through the field coil 11 and if the contacts 33 and 34 remain open long enough the voltage of the exciter 14 will build up sufficiently to not only decrease the flow of current from main 8 through field coil 11, but also to cause current to flow from main 4 through field coil 11 to main 8 thereby reversing the polarity of the dynamo 6. This latter polarity of the dynamo 6 will be in the direction to increase the voltage of the generator 1 and therefore will be referred to as a positive voltage. It will be understood that owing to the inductance of the circuits of the exciter 14 and dynamo 6 the contacts 33 and 34 can be opened and closed fast enough to prevent the voltages of the machines 14 and 6 from building up to the maximum allowing the voltage of the dynamo 6 to remain reasonably constant at any point between the maximum positive and the maximum negative.

Means for actuating the contacts so as to accomplish this result is shown in the drawing as a core 32 actuated by a solenoid 37 which is influenced by the voltages of the machines 14 and 6. The automatic switch is also made responsive to the voltage of the armature circuit of the generator 1 by means of a core 36 which is under the control of the coil 42 which is under the influence of the voltage of the transformer 48 which is so constructed as to supply to the coil 42 a voltage always bearing a certain ratio to the voltage of the armature circuit of generator 1. The coil 43 on the magnet 36 is energized by current inductively generated in the secondary of the transformer 53 and is proportional to the current in the main 50. Therefore the pull exerted on the core 36 is the resultant of the pulls due to the current and voltage elements of the armature leads of the generator 1. The result of this will be to cause the lever 28 to operate to increase the voltage of the armature leads of the generator 1 as the current in the armature circuit increases. The switch lever 25 is under the influence of the solenoid 37 which is connected between the main 8 and conductor 15 and in series with the resistance 40 which is used to protect the coil 37 and to cause the core 32 to respond quickly to changes in voltage between main 8 and conductor 15. That is it gives to the circuit which contains the coil 37 a high ohmic component thereby reducing the time constant of the circuit. The reason for connecting conductor 41 to conductor 15 instead of directly to the main 4 may be described as follows: A certain amount of current will flow from the main 8 through conductor 38, coil 37, conductor 39, resistance 40, conductor 41, to conductor 15 then through resistance 16 and conductor 17 to main 4. Since the resistance of the conductors 17, 15, 41, 39 and 38 are negligible the voltage drop along this circuit will be divided into three parts that of the resistances 16 the resistance 40 and the coil 37. The voltage drop across each of these elements will depend upon the current flowing in that element.

It will be seen that not only the current passing from main 8 through the coil 37 and resistance 40 but also the current passing from main 8 through field coil 11 and machine 14 will pass through the resistance 16. The amount of this current flowing by way of coil 37 and resistance 40 will depend upon the voltage of the field mains 8 and 4 and the amount of current flowing by way of field coil 11 and armature 14 will depend upon the algebraic sum of the voltages of the field mains 8 and 4 and that of the armature 14. Therefore the lever 25 will be responsive to the voltage of the field mains 8 and 4 and also to that of the machine 14. And since the lever 28 is responsive to variation in the voltage of the armature leads 49 and 50 the automatic switch composed of the levers 25 and 28 will be responsive to variations of voltage of either of the machines 1, 6 or 14. This is an important feature of my invention.

When the apparatus herein described has been properly connected and adjusted it will operate in the following manner to maintain a constant voltage on the armature leads 49 and 50, or if it is so desired the coil 43 can be adjusted so that the voltage on the mains 49 and 50 will increase as the current flowing in the main 50 increases. We will assume for example that the voltage on the mains 49 and 50 has decreased sufficiently to allow the spring 35 to pull the contact 34 away from the contact 33. Then the current which has been flowing through the contacts 33 and 34 will have to divide through the field coil 18 and the resistance 21. The direction of this current through the field 18 will be such as to cause the machine 14 to generate a voltage opposing the flow of current from main 8 through the field coil 11 machine 14 and resistance 16 back to main 4. The instant this current decreases the potential drop across the resistance 16 will decrease and since the algebraic sum of the voltages across resistances 16 and 40 and coil 37 always equals the voltage across the mains 4 and 8 the voltage across the resistance 40 and coil 37 will increase and cause the coil 37 to exert a greater pull on the core 32 tending to overcome the spring 31 to bring the contact 33 against the contact 34.

The decrease of current in the circuit containing field coil 11 machine 14, and resistance 16 aside from decreasing the potential drop across the resistance 16 will vary the voltage of machine 6 in the direction to raise the voltage of mains 4 and 8 which will increase the voltage across the resistance 16 and 40 and the coil 37. This increase of voltage across the coil 37 will tend to raise the core 32 to close the contacts 33 and 34. The increase of voltage on the mains 4 and 8 will also cause more current to flow through the field coils of the generator 1 to increase the voltage of the mains 49 and 50. This increase of voltage on the mains 49 and 50 will increase the pull of the coil 42 on the core 36 to bring the contact 34 against the contact 33. When the sum of these three pulls is sufficient to overcome the springs 31 and 35 and bring the contacts 33 and 34 into contact the field coil 18 will be short-circuited and the voltage of the machine 14 will begin to decrease allowing the current flowing from main 8 through field coil 11 machine 14 and resistance 16 to increase thereby increasing the voltage drop across the resistance 16 which will decrease the voltage across resistance 40 and coil 37 since the algebraic sum of these three voltages equals the voltage across the mains 4 and 8. This decrease of voltage across the coil 37 will tend to open the contacts 33 and 34. This increase of current flowing from main 8 through field coil 11 will vary the voltage of the machine 6 to decrease the voltage of the mains 4 and 8 which will also tend to weaken the pull of the coil 37 on the core 32 thereby assisting the spring 31 to open the contacts 33 and 34, but the decrease of voltage on the mains 4 and 8 will cause less current to flow through the field of generator 1 thereby decreasing the voltage of the mains 49 and 50, which will weaken the coil 42 and allow the spring 35 to pull contact 33 away from contact 34 which will cause current to again flow through the field 18 whereupon the apparatus will start on a second cycle of operation similar to the one just described. When the apparatus is once in operation it will continue to pass through these cycles of operation, regardless of the condition of the circuit to be regulated. The relative duration of the different parts of the cycle however is dependent upon the condition of the circuit to be regulated. From this it will be seen that the automatic switch composed of the levers 25 and 28 is responsive to each of the voltages of the system independent of the others and therefore will operate to prevent any marked variations in either of said voltages. When the current in the armature circuit of the generator increases the current supplied to the coil 43 by the transformer 53 will increase and partly neutralize the effect of coil 42 on core 36 and a greater voltage will be required on the mains 49 and 50 to overcome the spring 35 and the regulator will operate to increase the voltage of the system as the current flowing in the armature circuit of the generator 1 increases. The dynamo 6 will be of sufficient capacity to furnish the exciter, current for the generator 1 and the exciter 14 will be of sufficient capacity to furnish the field current for dynamo 6. The resistance 16 will have about one ohm resistance and be of sufficient carrying capacity to carry the field current of dynamo 6. The resistances 21 and 22 will be of sufficient carrying capacity and have sufficient resistance that when the contacts 33 and 34 are open the voltage of the exciter 14 will equal twice the voltage of the mains 4 and 8.

What is claimed is:—

1. The combination of an alternating current generator, a circuit of constant polarity, a dynamo having its armature circuit in series with, and its field circuit in parallel with the field circuit of said generator, an exciter having its armature circuit in series with the field of said dynamo and its field circuit connected to said circuit of constant polarity and means controlled by the voltage of the generator, by the voltage of the dynamo and by the voltage of the exciter for controlling the voltage of the exciter.

2. The combination of an alternating current generator, a dynamo having its armature circuit in series with the field of said generator, means for supplying to the field of the dynamo a voltage of constant polarity, a source of electromotive-force for opposing said voltage of constant polarity, a pair of contacts for controlling the voltage of said source, and means for actuating the contacts to cause the voltage of the dynamo to vary through zero.

3. The combination of an alternating current generator, a dynamo having its armature circuit in series with the field of said generator, means for supplying to the field of said dynamo a voltage of constant polarity, voltage producing means for opposing said voltage of constant polarity, and means controlled by the voltage of said generator for controlling the voltage of said voltage producing means to cause the dynamo to work first at one polarity and then at the other.

4. In an electric system a generator having an armature circuit and a field circuit, a dynamo having its armature circuit in series with the field circuit of the generator and its field circuit in parallel therewith, an exciter having its armature circuit in series with the field circuit of the dynamo and its field circuit in parallel therewith and means responsive to changes of electrical condition in the armature circuit of the generator for controlling the voltage of the exciter.

5. In an electric system a generator having an armature circuit and a field circuit, a dynamo having its armature circuit in series with the field circuit of the generator and its field circuit in parallel therewith, an exciter having its armature circuit in series with the field circuit of the dynamo and its field circuit in parallel therewith and means responsive to changes of electrical condition in the armature circuit of the exciter for controlling the voltage of the exciter.

6. In an electric system a generator having an armature circuit and a field circuit, a dynamo having its armature circuit in series with the field circuit of the generator and its field circuit in parallel therewith, an exciter having its armature circuit in series with the field circuit of the dynamo and its field circuit in parallel therewith and means responsive to changes of electrical condition in the armature circuits of the generator, the dynamo and the exciter for controlling the voltage of the exciter.

In testimony that I claim the foregoing as my own, I have hereto affixed my signature in the presence of two witnesses.

FORREST E. RICKETTS.

Witnesses:
JOHN T. FARDY,
STEPHEN D. BROADTENT.